(12) United States Patent
Xie et al.

(10) Patent No.: US 11,239,414 B2
(45) Date of Patent: Feb. 1, 2022

(54) PHYSICAL UNCLONABLE FUNCTION FOR MRAM STRUCTURES

(71) Applicant: International Business Machines Corporation, Armonk, NY (US)

(72) Inventors: Ruilong Xie, Niskayuna, NY (US); Alexander Reznicek, Troy, NY (US); Oscar van der Straten, Guilderland Center, NY (US); Koichi Motoyama, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 16/828,252

(22) Filed: Mar. 24, 2020

(65) Prior Publication Data

US 2021/0305499 A1    Sep. 30, 2021

(51) Int. Cl.
| | |
|---|---|
| *H01L 43/12* | (2006.01) |
| *H01L 43/02* | (2006.01) |
| *H01L 27/22* | (2006.01) |
| *H04L 9/32* | (2006.01) |
| *H01L 43/08* | (2006.01) |

(52) U.S. Cl.
CPC ............ *H01L 43/12* (2013.01); *H01L 27/222* (2013.01); *H01L 43/02* (2013.01); *H01L 43/08* (2013.01); *H04L 9/3278* (2013.01); *H04L 2209/12* (2013.01)

(58) Field of Classification Search
CPC ....... H01L 43/12; H01L 27/222; H01L 43/02; H01L 43/08; H04L 9/3278; H04L 2209/12; H04L 9/0866

USPC .......................................................... 257/421
See application file for complete search history.

(56) References Cited

U.S. PATENT DOCUMENTS

| | | | |
|---|---|---|---|
| 9,495,627 B1 * | 11/2016 | Annunziata | ............ H01L 43/02 |
| 9,666,582 B1 | 5/2017 | Li et al. | |
| 9,985,959 B2 | 5/2018 | Watanabe | |
| 10,311,930 B1 | 6/2019 | Kim et al. | |
| 10,468,585 B1 | 11/2019 | Nguyen et al. | |
| 2017/0214532 A1 | 7/2017 | Das et al. | |
| 2017/0272258 A1 * | 9/2017 | Tanamoto | ............. H04L 9/3278 |
| 2018/0262353 A1 | 9/2018 | Riou | |
| 2018/0270058 A1 | 9/2018 | Watanabe et al. | |

(Continued)

FOREIGN PATENT DOCUMENTS

EP    3057032 A1    8/2016

OTHER PUBLICATIONS

Gao Y, Ranasinghe D, Al-Sarawi S, Kavehei O, Abbott D. Emerging physical unclonable functions with nanotechnologies. IEEE, DOI: 10.1109/ACCESS. Dec. 2015 pp. 1-19.

*Primary Examiner* — Jami Valentine Miller
(74) *Attorney, Agent, or Firm* — L. Jeffrey Kelly; Otterstedt, Wallace & Kammer, LLP

(57) ABSTRACT

An integrated circuit including a memory array and a physical unclonable function array is obtained by causing metal back sputtering in specific regions of the integrated circuit during ion beam etch. MRAM pillars within the memory array have larger widths than the underlying bottom electrodes while those within the physical unclonable function array have smaller widths than the underlying bottom electrodes. Metal residue deposited over tunnel barrier layers causes random electrical shorting of some of the MRAM pillars within the physical unclonable function array.

20 Claims, 5 Drawing Sheets

(56) References Cited

U.S. PATENT DOCUMENTS

2018/0337793 A1* 11/2018 Park .................... H04L 9/3278
2019/0036714 A1    1/2019 Kim et al.
2021/0111333 A1*  4/2021 Chang .................. H01L 43/02

* cited by examiner

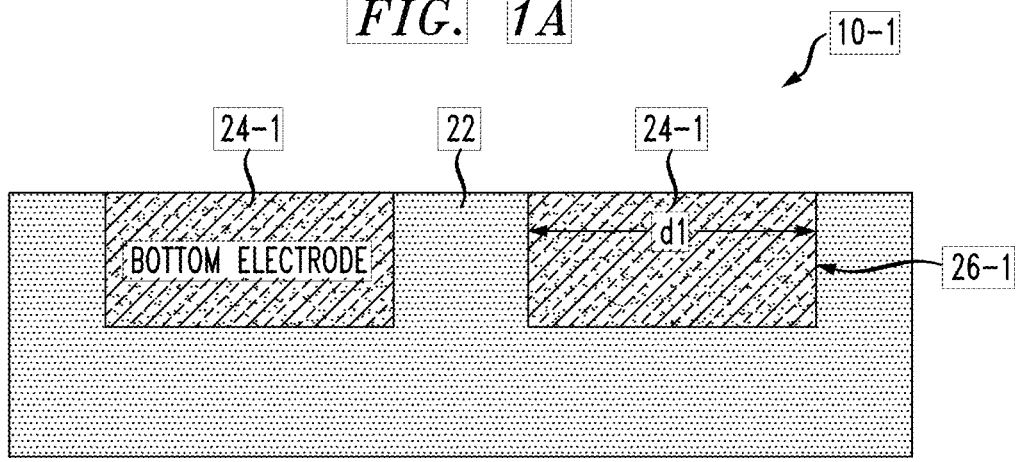
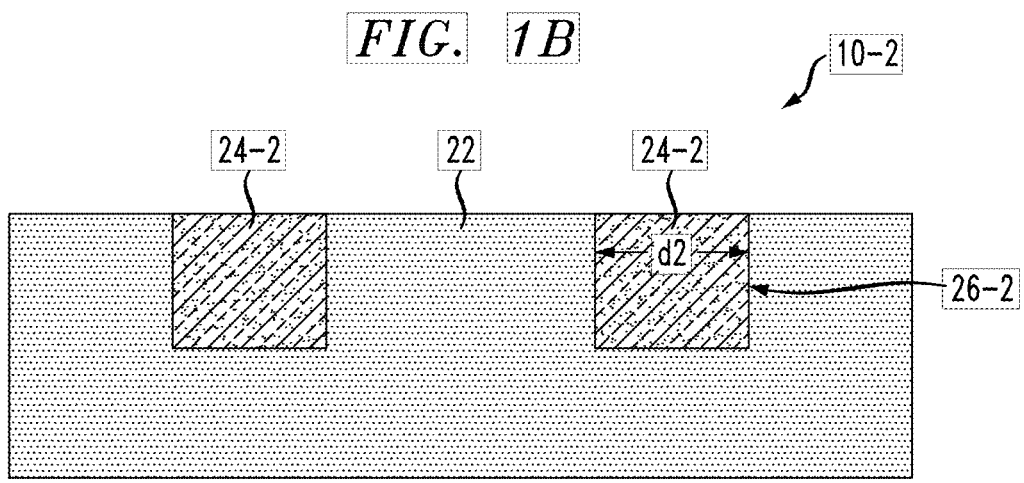

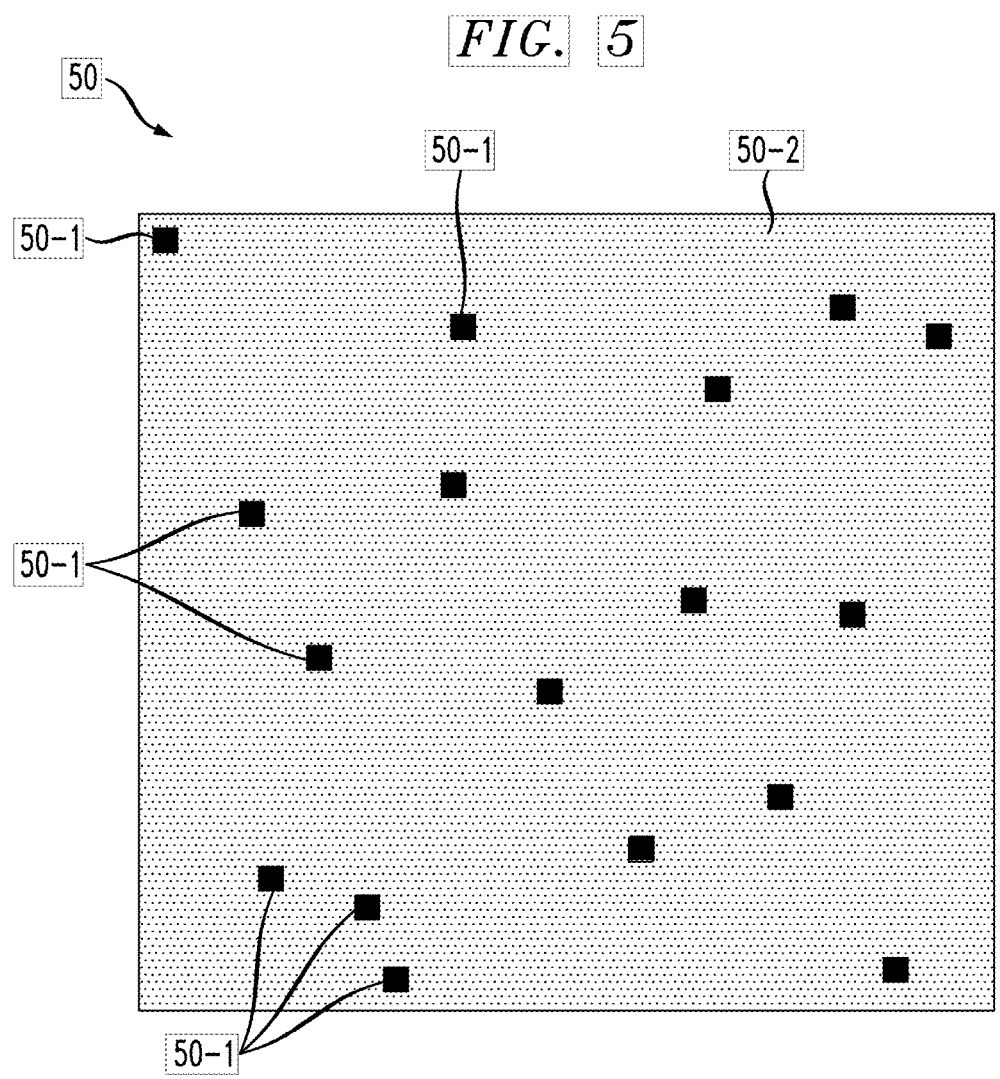

PHYSICAL UNCLONABLE FUNCTION FOR MRAM STRUCTURES

BACKGROUND

The present invention relates generally to the electrical, electronic and computer arts and, more particularly, to physical unclonable functions with arrays of magnetic tunnel junction (MTJ) memory devices.

A physical unclonable function (sometimes also called physically unclonable function), or PUF, is a physically-defined "digital fingerprint" that serves as a unique identity for a semiconductor device such as a microprocessor. They are based on unique physical variations which occur naturally during semiconductor manufacturing. A PUF is a physical entity embodied in a physical structure. PUFs can be implemented in integrated circuits and are typically used in applications with high security requirements, more specifically cryptography.

Security is an important factor in interconnected environments, and hardware protection is important as security at the network and system levels. Silicon physically unclonable functions (PUFs) are increasingly used as a hardware root of trust and an entropy source for cryptography applications. In such applications, the reliability of PUF output is key to a successful implementation. Both weak and strong PUFs obtain output by amplifying analog signals from physical properties on IC blocks (e.g. propagation delay, ring oscillator, time-controlled oxide breakdown or threshold voltage of SRAM transistors). These physical measurements are by nature sensitive to environmental conditions, such as temperature, operating voltage, thermal/interface noise of transistors, process corners and aging. As a result, it may be difficult to obtain a stable PUF output without taking additional stabilization and error-correction techniques, e.g. temporal majority voting (TMV), pre-burning on PUF bits for end-of-life (EOL) prediction and reliability screening, masking algorithms, as well as leveraging parity bits for an Error-Correcting-Code (ECC).

BRIEF SUMMARY

MRAM PUF arrays are formed with metal randomly deposited at tunneling barriers of MRAM devices within such arrays, thereby randomly electrically shorting the devices and facilitating random variations in the physical characteristics of the devices comprising the MRAM PUF arrays.

A method of fabricating an MRAM structure including a physical unclonable function and a memory array includes forming a stack including a magnetic tunnel junction and a top electrode layer over an interlevel dielectric layer comprising a plurality of bottom electrodes and forming first and second arrays of MRAM pillars from the stack by subjecting the stack to etching. The formation of the arrays of MRAM pillars causes the MRAM pillars in the first array to have smaller widths than the bottom electrodes in a first region of the interlevel dielectric layer and causes electrical shorting of some of the MRAM pillars in the first array. Formation of the MRAM pillars further causes the MRAM pillars in the second array to have larger widths than the bottom electrodes in a second region of the interlevel dielectric layer.

In a further aspect of the invention, an integrated circuit includes a first array of MRAM pillars comprising a first physical unclonable function and adjoining, respectively, a plurality of first bottom electrodes, the MRAM pillars in the first array having smaller widths than the first bottom electrodes, and a second array of MRAM pillars comprising a memory array. The MRAM pillars in the second array adjoin, respectively, a plurality of second bottom electrodes and have larger widths than the second bottom electrodes.

Techniques and structures as disclosed herein can provide substantial beneficial technical effects. By way of example only and without limitation, one or more embodiments may provide one or more of the following advantages:
  compatible with embedded MRAM technologies;
  additional masks not required during fabrication of MRAM PUF arrays;
  additional processing steps not required during fabrication of MRAM PUF arrays;
  MRAM PUF array is reliable and not influenced by temperature variation.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 1A and 1B are schematic, cross-sectional views showing, respectively, a first region of a dielectric layer including bottom electrodes having relatively large dimensions d1 and a second region thereof including bottom electrodes having relatively small dimensions d2;

FIG. 5 is a schematic, top plan view of a semiconductor chip including a plurality of MRAM-PUF regions.

Figure 2A:
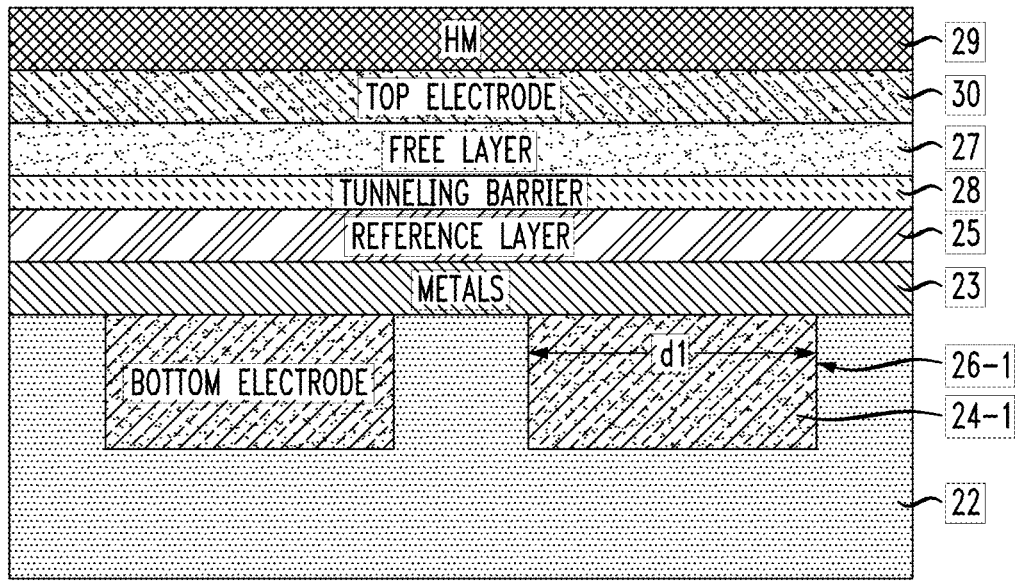
FIGS. 2A and 2B are schematic, cross-sectional views showing, respectively, the structures of FIGS. 1A and 1B following MRAM stack deposition.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative embodiments. It is to be appreciated, however, that the specific embodiments and/or methods illustratively shown and described herein are to be considered exemplary as opposed to limiting. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Silicon-based devices typically include multiple interconnect metallization layers above a device (front-end-of-line/ FEOL) layer that contains field-effect transistors (FETs) or other structures. FEOL processing includes high-temperature steps for manipulating semiconductor conductivity. Middle-of-line (MOL) processing includes steps typically used for fabricating metal contacts for logic circuitry components such as field-effect transistors (FETs), resistors, diodes, and capacitors. Back-end-of-line (BEOL) processing involves the creation of metal interconnecting wires that connect the devices formed in FEOL processing to form electrical circuits.

Magnetic random access memory (MRAM) can offer relatively fast operational speed than flash memory. Magnetic tunnel junctions employed in MRAM bits include two magnetic layers and a tunnel barrier layer positioned between the magnetic layers. The magnetic layers can be characterized as "reference" and "free" layers, respectively while the tunnel barrier can be a thin tunneling oxide layer. The magnetization direction of one layer of the junction is fixed so that it serves as the reference layer. The magnetization of the free layer can be determined by an electrical input. An MTJ includes two stable resistance states for digital memory applications and multiple states for neuromorphic applications. Charge current from the reference layer to the free layer causes the MTJ to switch between states by overcoming the energy barrier. Embedded MRAM may replace flash memory in some applications. As described below, an MRAM PUF array can be created by randomly shorting MRAM bits within the MRAM PUF array. The MRAM PUF array(s) is incorporated in one or more regions with normally functioning MRAM array(s) on the same chip and can be used to authenticate the chip.

Dense MTJ structures (MRAM bits) can be formed, for example, in a BEOL layer for memory and neuromorphic applications. Low-temperature BEOL processes preserve delicate MTJ devices where both magnetic and tunneling layers are highly sensitive to excessive temperature treatments during post processing. Narrow access wires (not shown) run above and below the MTJ memory cells.

Memory devices can be integrated close to the FEOL layer, in special sections on a chip, or alternatively within a dedicated memory chip. An MRAM is one type of memory device that can be integrated with BEOL CMOS processing just above the FEOL layer, for example between the M2 and M3 lines or layers. A first metal layer M1 (not shown) includes contacts and via conductors (not shown) that are electrically connected to the electronic devices in the FEOL layer. A second metal layer M2 includes copper lines that are electrically connected to the M1 layer. The memory cell structures to be formed can, for example, include one access transistor or can be of cross-point type where all active elements (transistors) are located at the array periphery. In either case, the MTJ memory element has two connections through M2 metal lines at the bottom and through M3 metal lines (not shown) at the top. The bottom M2 line of an MTJ MRAM cell may connect to the source of an NFET access transistor while the top M3 line of an MTJ MRAM cell connects to array periphery circuitry. Both M3 and M2 lines can be referred as bitlines. In some embodiments, as many as 64,000 individual MTJ cells or bits are connected to a single M3 bitline.

A monolithic structure including chip regions 10-1 and 10-2 as shown in FIGS. 1A and 1B can be obtained following FEOL processing, formation of metal lines, and formation of bottom electrodes 24-1, 24-2 within an interlevel dielectric (ILD) layer 22. The ILD layer 22 may, for example, be formed from silicon oxide or a low-k dielectric material such as SiCOH and possibly include dielectric sub-layers. Chemical vapor deposition (CVD), including plasma-enhanced CVD, may be used for the deposition of low-k (k less than 4.0) dielectric materials such as porous SiCOH). The bottom electrodes 24-1 in the chip regions 10-1 have larger dimension(s) than those in the other chip regions 10-2. As shown in FIGS. 1A and 1B, the dimension d1 (e.g. width) of the bottom electrodes 24-1 in the region 10-1 exceeds the corresponding dimension d2 of bottom 10-1 electrodes 24-2 formed in the other region 10-2. The electrodes 24-1, 24-2 are formed within trenches 26-1, 26-2.

Trench openings are conventionally formed in a dielectric layer by using, for example, known damascene techniques. Photolithography and etching steps follow dielectric layer deposition. Specifically, a photoresist (not shown) is applied over the dielectric layer. The photoresist can be applied by any suitable technique, including, but not limited to coating or spin-on techniques. A mask (not shown), which is patterned with shapes defining trench openings, is provided over the photoresist. The mask pattern is transferred to the photoresist using a photolithographic process, which creates recesses in the uncovered regions of the photoresist. The patterned photoresist is subsequently used to create the same pattern of recesses in the dielectric layer through conventional etching typically used for forming trenches. A dry etch (for example, a reactive ion etch) may be employed to form such trenches. The etching selectively removes a portion of the dielectric (ILD) layer 22. The depth(s) of the trench openings can be controlled by using a timed etching process. Alternatively, the dielectric layer may include multiple layers that may be selectively etched. In such a case, the etch process selectively removes the upper layer(s) of the dielectric layer, stopping at a lower layer thereof that forms an etch stop. After formation of the trench openings 26-1, 26-2, the photoresist may be stripped by ashing or other suitable process from the ILD layer. The resulting structure may be subjected to a wet clean.

A further stage in the fabrication process includes depositing a conformal layer of liner material. The conformal layer of liner material lines the sidewalls and bottom surfaces of the trenches 26-1, 26-2 or other openings within the ILD layer 22. The liner material may include one or more thin layers of material such as, for example, tantalum (Ta), tantalum nitride (TaN), titanium nitride (TiN), cobalt (Co), ruthenium (Ru), tungsten (W), tungsten nitride (WN), titanium-tungsten (TiW), tungsten nitride (WN) manganese (Mn), manganese nitride (MnN) or other liner materials (or combinations of liner materials) such as RuTaN, Ta/TaN, CoWP, NiMoP, NiMoB which are suitable for the given application. The thin liner (not shown) serves as a diffusion barrier layer and adhesion layer. The conformal layer of liner material is deposited using known techniques such as CVD, ALD, or PVD.

A thin conformal copper (Cu) seed layer can be deposited over the surface of the liner using PVD, followed by the electroplating of Cu to fill the damascene (or dual damascene) openings in the ILD layer 22. A thermal anneal stage follows electroplating. The overburden liner, seed, and metallization materials are then removed by performing a three step chemical mechanical polishing process (CMP) to planarize the surface of the semiconductor structure down to the ILD layer 22. A metal cap layer (not shown) may be selectively deposited on the exposed metal interconnect layer within the trenches. For example, metals such as cobalt, ruthenium or manganese may be deposited using chemical vapor deposition or atomic layer deposition to form the metal cap layers. Post-deposition cleaning may be required to ensure there is no leakage or degradation resulting from possible metal residues on the resulting structure. Electrodes 24-1 and 24-2 are thereby formed in the ILD layer 22 and are electrically connected to copper bitlines therein. In some embodiments, the bottom electrodes can be alternative materials, such as TiN only, TaN only, TiN/W, or other electrical conductors.

The M2 layer may alternatively be referred to as the bottom or lower line of a memory element or cell or bottom portion of the bitline in accordance with some exemplary embodiments. An SiCOH dielectric film having a dielectric constant (k) of about 2.7-2.8 can be employed in forming the M2 layer or subsequent metallized layers that may alternatively contain MRAM arrays in accordance with the teachings herein. Such a dielectric film can be deposited using PECVD. The film is patterned as described above to form trenches that are later filled with copper and metal caps to form bitlines and bottom electrodes 24-1, 24-2. The electrodes preferably have relatively low resistance. As the trenches 26-1, 26-2 in the different regions 10-1, 10-2 have different dimensions, the electrodes 24-1, 24-2 formed in the different regions will also have different dimensions. The electrodes formed in any single chip regions 10-1 or 10-2 preferably have the same dimensions. For example, the electrodes in the chip region 10-1 to be employed in forming a PUF array have a relatively large width dimension $d2$ while those in the chip region 10-2 to be used in forming normally operating MRAM devices have a relatively small width dimension $d1$. Low resistance electrodes can be obtained by annealing and recrystallization of the deposited metal.

Figure 2B:
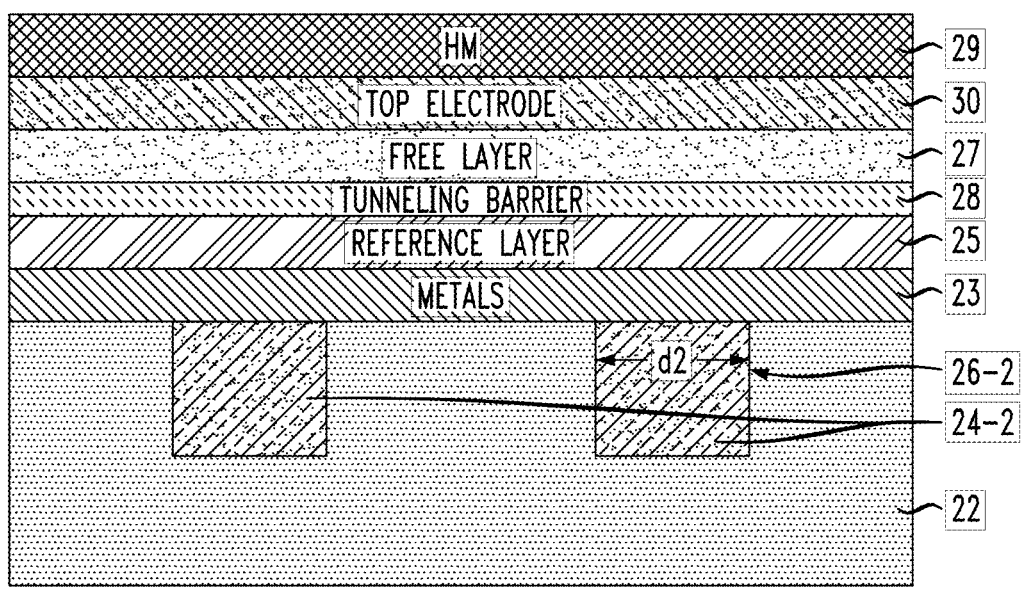

Referring to FIGS. 2A and 2B, MTJ stack films are deposited using, for example, physical vapor deposition (PVD) or ion beam deposition (IBD). The MTJ stack films may be deposited over all regions of entire chip in which MRAM devices are to be fabricated. Both illustrated chip regions 20-1 and 20-2 accordingly include portions of the same MTJ stack.

The tunnel barrier layer 28, for example MgO, can be formed by oxidizing a metal layer without oxidizing the underlying reference layer 25. A metal capping layer (not shown) can be formed over the free layer 27. The metal capping layer can, for example, be composed of Nb, NbN, W, WN, Ta, TaN, Ti, TiN, Ru, Mo, Cr, V, Pd, Pt, Rh, Sc, Al or other high melting point metals or conductive metal nitrides. The capping layer can have a thickness from two (2) nm to twenty-five (25) nm. A top electrode layer 30 is formed on the capping layer or the free layer 27. The top electrode 30 can be composed of Ta, TaN, Ti, TiN, Ru, RuN, RuTa, RuTaN, Co, CoWP, CoN, W, WN or any combination thereof. The top electrode 30 can have a thickness from two (2) nm to twenty-five (25) nm.

Figure 3A:
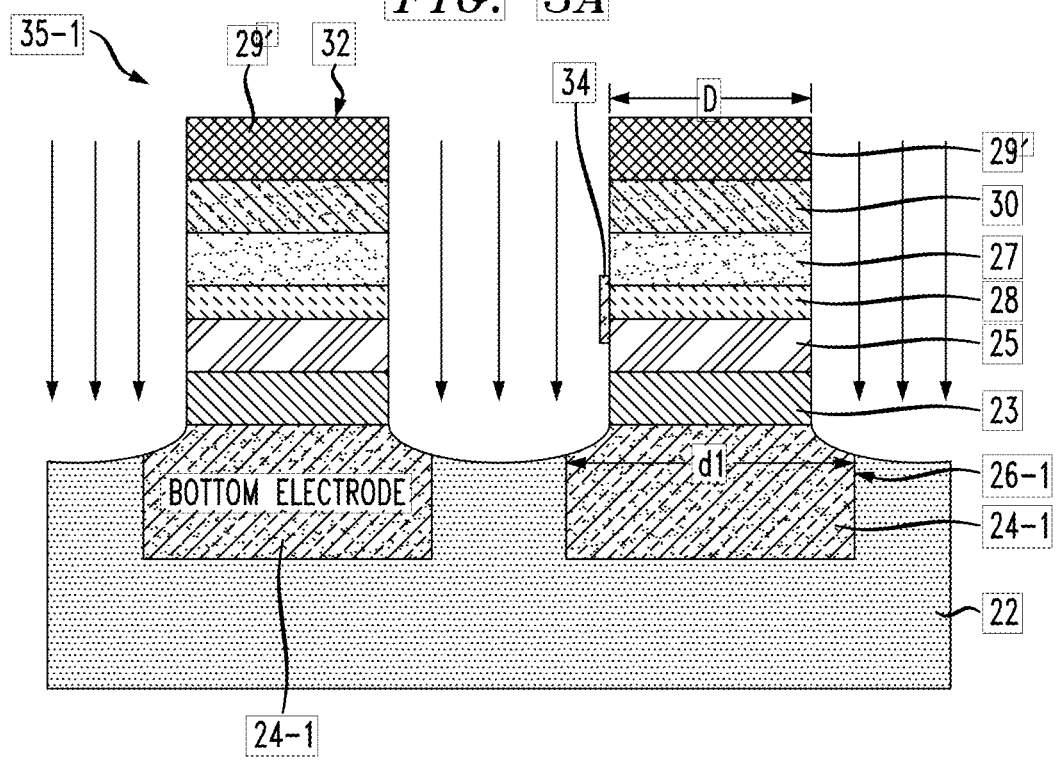
FIGS. 3A and 3B are schematic, cross-sectional views showing, respectively, the structures of FIGS. 2A and 2B following formation of MTJ pillars from the MRAM stacks.
Figure 3B:
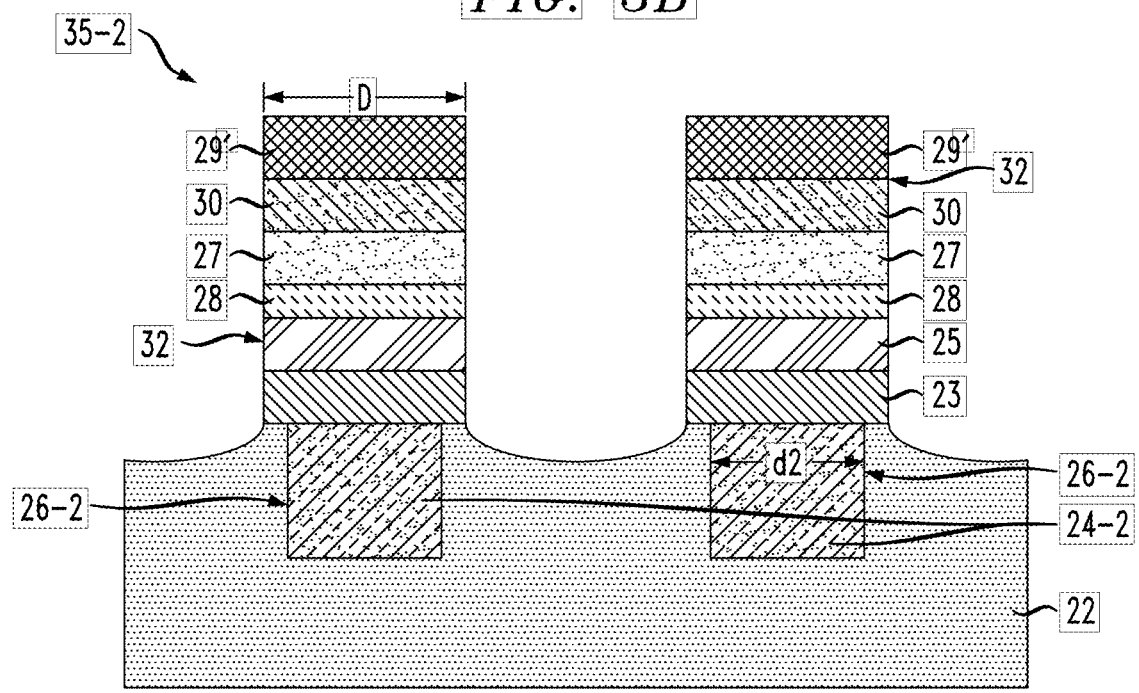

The patterning of the MTJ stack films to form MTJ pillars 32, two of which are shown in each of FIGS. 3A and 3B, is accomplished by a stack etching process. Ion milling (ion beam etching or IBE) is an effective MTJ stack etching technique. Dielectric caps 29' are formed on the pillars 32 from a hard mask 29 adjoining the top surfaces of the top electrode layer 30. The dielectric caps 29' may comprise silicon nitride or other composition suitable for ion beam etching of the MTJ stack film. The dielectric caps are removed subsequent to ion beam etching.

Referring again to the exemplary regions 35-1, 35-2 of the chip shown, respectively, in FIGS. 3A and 3B, MTJ pillars 32 are shown following deposition and patterning of the hard mask and ion beam etching of an MTJ stack film. The etching of the MTJ stack film results in the formation of vertical MTJ pillars 32 from the stack film. The vertical pillars 32 in one region 35-1 are narrower than the relatively large electrodes 24-1 over which they are formed. The widths of the pillars 32 in the other region 35-2 are greater than the electrodes 24-2 over which they are formed. The vertical pillars 32 have the same widths in both chip regions 35-1, 35-2 in one or more embodiments. In an alternative embodiment, the widths of the electrodes in both regions 35-1, 35-2 are the same and the etching process forms vertical pillars having varying widths. Specifically, relatively narrow MTJ pillars having widths smaller than the bottom electrode widths would be formed in one or more regions 35-1. In other region(s) 35-2, relatively wide MTJ pillars would be formed that have widths greater than the widths of the bottom electrodes over which they are formed.

Each of the MTJ pillars 32 includes a magnetic tunnel junction comprised of a tunnel barrier layer 28 between a reference layer 25 and a free layer 27. Aluminum oxide and magnesium oxide are among the compounds that may form the tunnel barrier layer. The tunnel barrier layer 28 is made as thin as possible and typically just three nanometers (3 nm) or less, to allow for a significant tunneling current. An ultra-thin tunnel barrier layer 28 makes the MTJ structure sensitive to high-temperature thermal treatments, for the adjacent metal element can diffuse into and through such ultra thin-layer changing its properties. Annealing of a formed MTJ stack with an ultra-thin tunnel barrier layer 28 in excess of 500° C. is typically avoided. The free layer 27 may be formed of magnetically active metal such as Fe and/or Co, FeCoB, and combinations thereof as well as other interlayers known in the art, and may comprise multiple layers. The reference layer 25 may comprise multiple layers, including a pinning layer, ferromagnetic layers and a spacer layer between the ferromagnetic layers. One or more of such layers is identified as the metal layer 23 that adjoins the reference layer 25 in the figures. Exemplary materials for forming the magnetic reference layer include iron, nickel, cobalt, chromium, boron, manganese, and alloys thereof.

A large single array of MTJ pillars (MRAM bits) may be formed (64 kb to 256 Mb, or larger). Large single arrays of MTJ pillars can be replicated several times to get to the target capacity per product die (e.g. to one (1) Gb). The MTJ pillars 32 may, in some embodiments, form a "checkerboard" pattern, the pillar spacing (pitch) along a subsequently formed top bitline being sixty nanometers or more. The bottom electrodes 24-1, 24-2 are electrically connected to metal contact vias which are, in turn, electrically connected to the M1 layer (not shown). The layers of the pillars 32 are not necessarily drawn to scale.

The formation of MTJ pillars using etching techniques can leave metallic residues on the pillars. Ion beam etching (IBE) allows the etching of stacks of multiple materials where the vapor pressure of the materials to be removed is negligible, but can leave metallic residues that adversely affect performance. The sizes of the metallic residue on pillar sidewalls may be non-uniform. Moreover, the metallic residue can be deposited randomly anywhere on the pillar sidewalls. Accordingly, some of the residue may be deposited over the tunnel barrier layer 28. Such residues may cause electrical shorting of the MRAM device or otherwise compromise device performance.

Referring to FIG. 3A, one or more regions 35-1 of a chip are configured after ion beam etching (arrows) such that the widths of the bottom electrodes exceed the widths of the resulting MTJ pillars 32. This configuration (d1>D) facilitates back sputtering of metal from the bottom electrodes 24-1, which is normally undesirable during MRAM fabrication. The deposition of back sputter metal can be random, resulting in residue deposition over the tunnel barrier layer 28 of some MTJ pillars 32 but not others. As shown in FIG.

3A, one of the two illustrated MTJ pillars 32 includes metal residue 34 over the tunnel barrier layer 28 and contacting both the reference layer 25 and the free layer 27. An MRAM device including an MTJ pillar with such metal residue 34 is electrically shorted while an MRAM device or bit formed from the other illustrated MTJ pillar in FIG. 3A will operate normally. The chip region(s) 35-1 in accordance with one or more embodiments includes multiple MTJ pillars that are electrically shorted and multiple MTJ pillars wherein metal residue, if present, does not span the tunnel barrier layers and does not cause electrical shorting.

The MTJ pillars 32 in other chip region(s) 35-2 obtained after etching either lack metal residue or such residue is insufficient to materially affect MRAM device operation. In such regions, the widths of the bottom electrodes 24-2 are smaller than the widths of the pillars 32 (d2<D). There is accordingly no back sputtering of metal from the bottom electrodes during ion beam etching of the MTJ stack in such region(s). Back sputtering of dielectric material within the underlying ILD layer 22 does not result in electric shorting of the MTJ pillars and should not materially affect MRAM device operation in the region 35-2. As schematically illustrated in FIG. 3B, some dielectric material is removed from the ILD layer 22 during IBE while the underlying electrodes 24-2, protected by the pillars 32, remain intact. In contrast, both dielectric material and electrode metal are partially removed during ion beam etch of the region 35-1 where random electrical shorting of MTJ pillars is desired. The pillars 32 in the two regions 35-1, 35-2 may or may not have the same width.

An encapsulation layer is formed over the MTJ pillars 32. The encapsulation layer may comprise one layer or a plurality of layers. For example, a conformal dielectric layer such as silicon nitride can be deposited over the MTJ pillars to provide barrier properties. In embodiments wherein the encapsulation layer is a conformal layer of silicon nitride, a layer thickness of twelve to fifteen nanometers is formed in one or more exemplary embodiments. The silicon nitride layer extends over the pillars 32 as well as top surfaces of the ILD layer 22, for example an M2 layer. A silicon nitride layer having a thickness of five to six nanometers is sufficient to provide an acceptable copper and oxygen diffusion barrier when employed in conjunction with, for example, an underlying manganese silicate layer two to three nanometers in thickness that adjoins the sidewalls of the pillars. A combined manganese silicate/silicon nitride diffusion barrier will have a lower average dielectric constant (k) than barriers consisting only of silicon nitride. Relatively thin copper/oxygen diffusion barrier layers enable nano-MTJ device fabrication compatible with advanced CMOS scaling. Dielectric sidewall spacers 36 may be formed from the conformally deposited layer by employing a reactive ion etch.

Figure 4A:
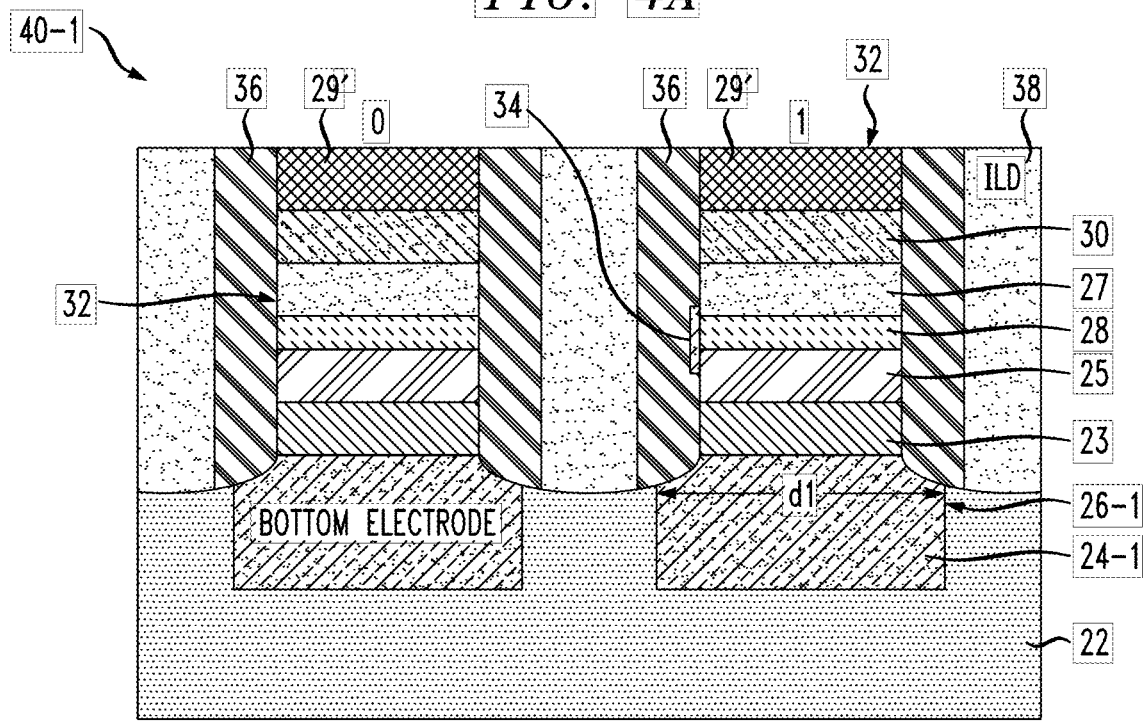
FIGS. 4A and 4B are schematic, cross-sectional views showing, respectively, the structures of FIGS. 3A and 3B following formation of spacers on the MTJ pillars and deposition of an interlevel dielectric layer.
Figure 4B:
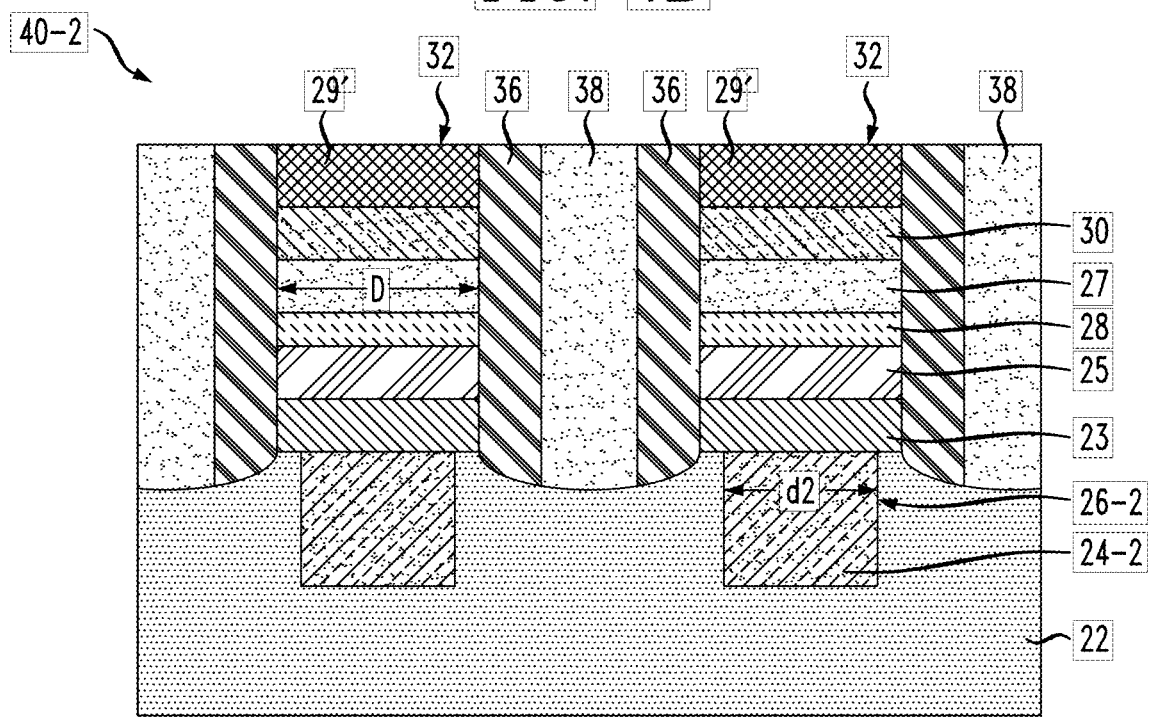

A further interlevel dielectric (ILD) layer 38 is deposited over the MTJ pillars 32 and the spacers 36. The ILD layer 38, like interlayer 22, may be formed from silicon oxide or a low-k dielectric material such as SiCOH as described above and may include multiple dielectric sub-layers. Deposition processes for ILD layer 38 should include a gap fill capability due to underlying topography, e.g. ability to fill in between MTJ pillars. Chemical vapor deposition (CVD), including plasma-enhanced CVD or flowable CVD, may be used for the deposition of low-k (k less than 4.0) dielectric material(s) such as porous SiCOH. Alternatively, a spin-on deposition of flowable low-k material can be employed. The ILD layer 38 fills the spaces between the pillars 32 and adjoins the spacers 36. The ILD layer 38 can be optionally cured using various known curing techniques including UV-light-assisted cure at below 400° C. The resulting structure is then subjected to chemical mechanical planarization (CMP) down to the top surfaces of the dielectric (hard mask) caps 29' to obtain a structure including PUF and memory regions 40-1, 40-2 as schematically illustrated in FIGS. 4A and 4B.

A top copper bitline or, equivalently, the MRAM bitline (not shown) is formed using an upper metallization layer such as an M3 layer or other metallized layer. An M3 layer is formed similar to M2 layer using damascene methods. An ILD layer (not shown) is first deposited over the regions 40-1, 40-2 shown in FIGS. 4A and 4B. Trench openings are conventionally formed in the ILD layer by using known damascene techniques. The contact vias (not shown) of this M3 level make a direct contact with top electrodes 30 of MTJ pillars 32 to form a MRAM bitline. A top (M3) copper bitline (not shown) is electrically connected to the underlying top electrodes 30 of the MTJ pillars by via conductors. Spacing of adjacent MTJ pillars along a top copper bitline may be about 60 nm or more. The area of an individual MRAM cell may be less than 0.01 µm'. The bitlines allow normal functioning of the MRAM devices within one or more memory regions of the chip, such as the region 40-2 illustrated in FIG. 4B. The bitlines further enable identification of the chip using the devices in the PUF region(s) of the chip, some of which are expected to operate as normal MRAM devices and others being electrically shorted due to the presence of metal residue 34 on the tunnel barrier layers 28 thereof. It will be appreciated that MRAM arrays comprising memory regions and PUF regions and corresponding bitlines as described herein can be formed in various layers of a structure and not necessarily within M2 and M3 layers.

As schematically illustrated in FIG. 5, a semiconductor chip 50 comprising an integrated circuit can be provided that includes multiple PUF regions or blocks 50-1 dispersed among a memory region 50-2. The area of memory region 50-2 greatly exceeds the combined areas of the PUF regions 50-1, allowing most of the integrated circuit to be employed for normal memory functions. As discussed above, the bottom electrodes of the MRAM devices within the PUF regions 50-1 have larger widths than the bottom electrodes in the memory region 50-1 in some embodiments. One or more of the PUF regions 50-1 can be accessed using the bitlines and the response generated processed to determine whether it is an expected response. Specifically, if metal is resputtered at an MRAM device in a PUF region 50-1, the device will be electrically shorted and exhibit very low electrical resistance. In the absence of such metal residue, the electrical resistance of the MRAM device will be higher. Low electrical resistance can be defined as state 1 and relatively high electrical resistance as state 0 in an exemplary embodiment. (An electrically shorted MRAM device is designated as state "1" in FIG. 4A while a device exhibiting relatively high resistance is designated as state "0" therein.) A PUF region 50-1 containing a large array of MRAM devices or bits will generate a unique pattern when addressed (such as 0010111001010 . . . ). This pattern is unique for a particular hardware item, such as a wafer or a die. The pattern, being obtained by random metal residue deposition on MRAM pillars, is very stable and will not be materially influenced by external factors such as temperature.

The drawing figures as discussed above depict exemplary processing steps/stages in the fabrication of exemplary structures. Although the overall fabrication methods and the structures formed thereby are entirely novel, certain individual processing steps required to implement the method may utilize conventional semiconductor fabrication techniques and conventional semiconductor fabrication tooling. These techniques and tooling will already be familiar to one having ordinary skill in the relevant arts given the teachings herein. Moreover, one or more of the processing steps and tooling used to fabricate semiconductor devices are also described in a number of readily available publications, including, for example James D. Plummer et al., *Silicon VLSI Technology: Fundamentals, Practice, and Modeling* $1^{st}$ *Edition*, Prentice Hall, 2001, which is hereby incorporated by reference herein. It is emphasized that while some individual processing steps are set forth herein, those steps are merely illustrative, and one skilled in the art may be familiar with several equally suitable alternatives that would be applicable.

It is to be appreciated that the various layers and/or regions shown in the accompanying figures may not be drawn to scale. Furthermore, one or more semiconductor layers of a type commonly used in such integrated circuit devices or other layers may not be explicitly shown in a given figure for ease of explanation. This does not imply that the semiconductor layer(s) or other layer(s) not explicitly shown are omitted in the actual integrated circuit device.

Given the discussion thus far, it will be appreciated that, in general terms, a method of fabricating MRAM structures, includes forming a stack comprising a magnetic tunnel junction and a top electrode layer over a substrate layer including a plurality of bottom electrodes 24-1, 24-2 within a dielectric layer. FIGS. 2A and 2B illustrate a dielectric layer and a stack deposited over two regions of a wafer or a die to be formed from the wafer. The stack is etched, thereby forming MRAM pillars 32 as illustrated in FIGS. 3A and 3B. Each of the MRAM pillars is directly above one of the bottom electrodes 24-1, 24-2. The MRAM pillars 32 have smaller widths than the bottom electrodes in a first region 30-1 and greater widths than the bottom electrodes in a second region 30-2. The method allows fabricating PUF MRAM regions and memory MRAM regions simultaneously on the same chip, shorting some of the MRAM bits in the PUF MRAM regions during ion beam etch with random metal back sputter.

An integrated circuit in accordance with principles of the invention includes a first array of MRAM pillars 32 comprising a first physical unclonable function. The MRAM pillars in the first array adjoin, respectively, a plurality of first bottom electrodes 24-1 and have smaller widths than the first bottom electrodes. The integrated circuit further includes a second array of MRAM pillars comprising a memory array. The MRAM pillars in the second array adjoin, respectively, a plurality of second bottom electrodes 24-2. The MRAM pillars in the second array have larger widths than the second bottom electrodes. A plurality of the MRAM pillars in the first array are electrically shorted. As discussed above, metal residue 34 on some of the MRAM pillars 32 results in random electrical shorting. In some embodiments, the first bottom electrodes 24-1 are narrower than the second bottom electrodes 24-2. In other exemplary embodiments, the MRAM pillars 32 in the first array have smaller widths than the MRAM pillars in the second array.

At least a portion of the techniques described above may be implemented in an integrated circuit. In forming integrated circuits, identical dies are typically fabricated in a repeated pattern on a surface of a semiconductor wafer. Each die includes a device described herein, and may include other structures and/or circuits. The individual dies are cut or diced from the wafer, then packaged as an integrated circuit. One skilled in the art would know how to dice wafers and package die to produce integrated circuits.

Those skilled in the art will appreciate that the exemplary structures discussed above can be distributed in raw form (i.e., a single wafer having multiple unpackaged chips), as bare dies, in packaged form, or incorporated as parts of intermediate products or end products that benefit from having structures including magnetic tunnel junctions and region(s) enabling a physical unclonable function.

The illustrations of embodiments described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this invention. It should also be noted that, in some alternative implementations, some of the steps of the exemplary methods may occur out of the order noted in the figures. For example, two steps shown in succession may, in fact, be executed substantially concurrently, or certain steps may sometimes be executed in the reverse order, depending upon the functionality involved. The drawings are also merely representational and are not drawn to scale. Accordingly, the specification and drawings are to be regarded in an illustrative rather than a restrictive sense.

Embodiments may be referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown. Combinations of the above embodiments, and other embodiments not specifically described herein, will become apparent to those of skill in the art given the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" and "vertical" are used to indicate relative positioning of elements or structures to each other as opposed to relative elevation.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.72(b). It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A method of fabricating an MRAM structure including a physical unclonable function and a memory array, comprising:
    forming a stack comprising a magnetic tunnel junction and a top electrode layer over an interlevel dielectric layer comprising a plurality of bottom electrodes; and
    forming first and second arrays of MRAM pillars from the stack by subjecting the stack to etching, thereby:
        causing the MRAM pillars in the first array to have smaller widths than the bottom electrodes in a first region of the interlevel dielectric layer;
        causing electrical shorting of some of the MRAM pillars in the first array; and
        causing the MRAM pillars in the second array to have larger widths than the bottom electrodes in a second region of the interlevel dielectric layer.

2. The method of claim 1, wherein the bottom electrodes in the first region have larger widths than the bottom electrodes in the second region.

3. The method of claim 2, wherein etching the stack further includes etching portions of the bottom electrodes in the first region of the interlevel dielectric layer.

4. The method of claim 3, wherein etching portions of the bottom electrodes in the first region of the substrate layer causes back sputtering of metal from the bottom electrodes and random deposition of metal residue on the first array of MRAM pillars.

5. The method of claim 4, wherein etching the stack further includes etching portions of the interlevel dielectric layer in the second region of the substrate layer.

6. The method of claim 4, wherein etching the stack includes ion beam etching.

7. The method of claim 6, further including generating a chip or wafer identification pattern corresponding to the electrical resistances of the MRAM pillars in the first array.

8. The method of claim 6, further including forming spacers adjoining, respectively, the MRAM pillars, the bottom electrodes in the first region of the substrate layer, and the interlevel dielectric layer in the second region of the substrate layer.

9. The method of claim 8, further including depositing a further interlevel dielectric layer between the MRAM pillars and adjoining the spacers.

10. The method of claim 1, further including causing the MRAM pillars in the first array to have smaller widths than the MRAM pillars in the second array.

11. An integrated circuit comprising:
    a first array of MRAM pillars comprising a first physical unclonable function, the MRAM pillars in the first array adjoining, respectively, a plurality of first bottom electrodes, the MRAM pillars in the first array having smaller widths than the first bottom electrodes; and
    a second array of MRAM pillars comprising a memory array, the MRAM pillars in the second array adjoining, respectively, a plurality of second bottom electrodes, the MRAM pillars in the second array having larger widths than the second bottom electrodes.

12. The integrated circuit of claim 11, wherein a plurality of the MRAM pillars in the first array are electrically shorted by metal residue thereon.

13. The integrated circuit of claim 12, wherein the MRAM pillars comprise magnetic tunnel junctions including tunnel barrier layers, the metal residue adjoining the magnetic tunnel junctions of the electrically shorted MRAM pillars.

14. The integrated circuit of claim 13, wherein the first bottom electrodes have larger widths than the second bottom electrodes.

15. The integrated circuit of claim 14, wherein the MRAM pillars within the first array and within the second array have the same widths.

16. The integrated circuit of claim 14, including one or more further arrays of the MRAM pillars comprising one or more further physical unclonable functions, the MRAM pillars in the one or more further arrays adjoining, respectively, a plurality of further bottom electrodes, the MRAM pillars in the one or more further arrays having smaller widths than the further bottom electrodes, the one or more further physical unclonable functions and the first physical unclonable function being in discrete regions of the integrated circuit.

17. The integrated circuit of claim 16, wherein the further bottom electrodes have larger widths than the second bottom electrodes.

18. The integrated circuit of claim 11, wherein the first bottom electrodes and the second bottom electrodes adjoin an interlevel dielectric layer, the first bottom electrodes having larger widths than the second bottom electrodes.

19. The integrated circuit of claim 18, wherein the MRAM pillars comprise magnetic tunnel junctions comprising tunnel barrier layers, the first array of MRAM pillars including electrically shorted MRAM pillars including a metal residue adjoining the magnetic tunnel junctions and MRAM pillars that are not electrically shorted.

20. The integrated circuit of claim 11, wherein the MRAM pillars in the first array have smaller widths than the MRAM pillars in the second array.

* * * * *